US005890341A

United States Patent [19]

Bridges et al.

[11] Patent Number: 5,890,341

[45] Date of Patent: Apr. 6, 1999

[54] METHOD OF CONSTRUCTING A MODULAR STRUCTURE

[76] Inventors: Robert E. Bridges, 8766 Weirwood, Shreveport, La. 71129; Archie C. Epes, 1705 Audubon, Shreveport, La. 71105

[21] Appl. No.: 896,942

[22] Filed: Jul. 18, 1997

Related U.S. Application Data

[62] Division of Ser. No. 511,104, Aug. 4, 1995, Pat. No. 5,706,615.

[51] Int. Cl.[6] ........................... B60P 3/022; E04B 1/344; E04B 1/35; E04G 21/00

[52] U.S. Cl. .................... 52/745.2; 52/745.19; 52/220.1; 52/143; 52/79.5; 52/66; 52/69

[58] Field of Search .................................... 52/66, 69–71, 52/79.5, 143, 745.19, 745.2, 741.1, 220.1

[56] References Cited

U.S. PATENT DOCUMENTS

| | | | |
|---|---|---|---|
| 2,780,844 | 2/1957 | Bolt | 52/69 |
| 2,860,384 | 11/1958 | Wait et al. . | |
| 3,070,850 | 1/1963 | McClure | 52/69 |
| 3,492,767 | 2/1970 | Pincus . | |
| 4,067,158 | 1/1978 | Lawerance | 52/143 |
| 4,534,141 | 8/1985 | Fagoni | 52/68 |
| 4,545,171 | 10/1985 | Colvin | 52/79.5 |
| 4,788,802 | 12/1988 | Wikas | 52/69 |
| 5,106,142 | 4/1992 | Hegedus | 296/26 |
| 5,596,844 | 1/1997 | Kalinowski | 52/79.5 |
| 5,706,615 | 1/1998 | Bridges et al. | 52/105 |

*Primary Examiner*—Robert Canfield
*Attorney, Agent, or Firm*—John M Harrison

[57] ABSTRACT

A modular structure consisting of three modular units of approximately the same size, the center module being the primary module containing the mechanical components of the building, with plumbing, air conditioning and heating ducts, and electrical wiring in the slab floor structural foundation and door jambs. The primary module used to transport the entire structure is completed at the factory, requiring no further work at jobsite, with heating and cooling unit, hot water heater, cabinets and appliances, plumbing and light fixtures and accessories installed at the factory in permanent locations. The major exterior walls, slab floor foundation panels, and ceiling/roof panels for all three modules are similarly manufactured in one piece in full width and the length of the building, eliminating joints, speeding assembly and strengthening the components. The major components of the side modules, consisting of the slab floor foundation panels, ceiling/roof panels and the exterior side walls, are all hinged so that they fold to the side and on top of the primary module. Accessories and wall panels and partitions not hinged are placed on top of the primary module for transportation. Two end walls are bolted to the center module during transportation to the site. At the pre-leveled permanent site, the primary module is lowered to the ground and the hinged slab floor foundation panels, which include hinged and folded exterior walls, along with the ceiling/roof panels, are unfolded and permanently fastened in place for that site, but can be refolded if later relocation is needed. The slab floor foundation panels for all three modules are placed directly on the ground or on a pre-built foundation, single or multi-level design. If a pitched roof was ordered, trusses and pre-sized roofing panels transported on top of the primary module are attached to the flat roof of the center module. Two or more of these triple modules can be joined side-to-side or end-to-end or on top of each other, for erection of multiple-unit buildings.

7 Claims, 9 Drawing Sheets

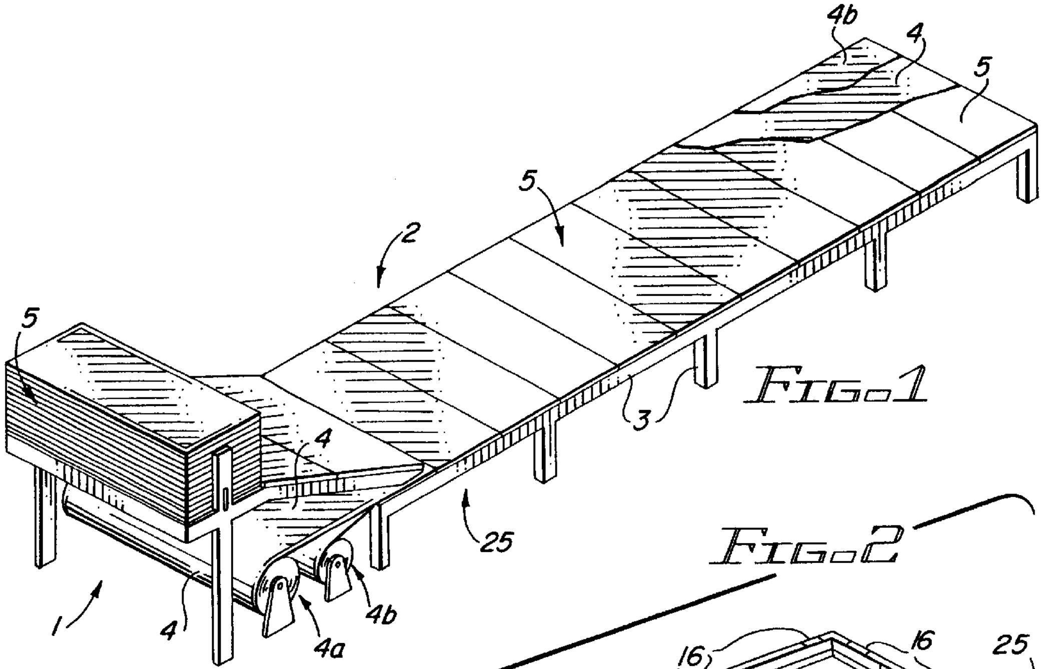
FIG. 1
FIG. 2
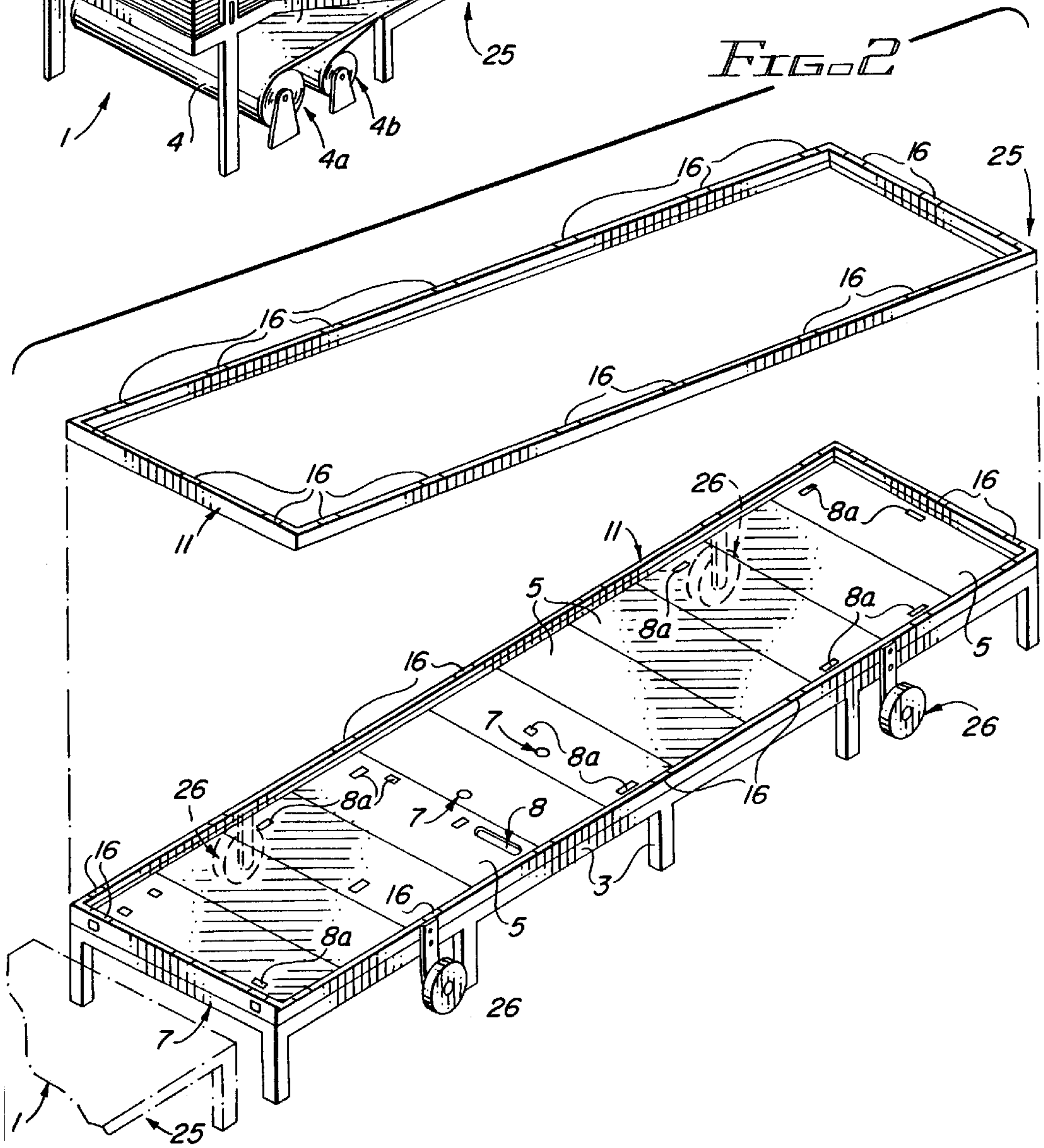

METHOD OF CONSTRUCTING A MODULAR STRUCTURE

This is a divisional of application Ser. No. 08/511,104 filed Aug. 4, 1995 now U.S. Pat. No. 5,706,615.

BACKGROUND OF THE INVENTION

FIELD OF THE INVENTION

This invention relates to modular houses, commercial buildings and structures, and more particularly, to a method of manufacturing folding modular structures, whereby three modular units, all approximately the same size, are constructed by building structural panels without interim joints, of the full width and length of the structure, and using a hinging and folding process creating a single, transportable primary module which unfolds directly on level ground or on a prepared foundation at the job site. The slab floor is built in the factory and becomes an integral foundation portion of the structure. Accordingly, no forming or pouring of concrete is required at the job site, as is necessitated when conventionally constructing a building on a concrete slab, and no digging and pouring concrete of foundations, beams or building piers for a crawl space building is required. All of this time and expense is eliminated, as only a level area the size of the structure is needed, because the factory-built slab foundation rests directly on the ground. Delays due to bad weather are therefore practically eliminated.

Construction of the modular structure of this invention begins with factory construction of a transportable primary module. The slab floor foundation section of the primary module is first constructed by placing a plastic or paper sheet equal to the size of the module, with a 1"=1" (full) scale floor plan printed on the downward side of a suitable surface, such as a rectangular, table-like structure or platform of selected size. A vinyl sheet floor covering or carpet equal to the width and length of the module is placed on the flooring, with the finished side placed downward. A single piece or multiple pieces of subfloor, such as 4 foot plywood sheets, are adjacently placed on the backside of the surface of the vinyl floor covering or carpet, which is then anchored by a rectangular structural frame, which frame is then mounted on the subfloor atop the perimeter of the module. The plumbing and electrical wiring are then added. Next, structural foam insulation is deposited evenly over the entire subfloor, covering the plumbing and wiring, a vinyl vapor barrier is then placed over the foamed insulation and removable caster wheels are fastened to the slab floor foundation, which is then removed from the table or platform and rotated 180°. Structural columns, door frames and partitions are then fastened to runners mounted on the floor on a preprinted plan located on the exposed side of the paper or vinyl floor plan sheet. A combination of the ceiling/roof panels, hinged together, is then anchored atop the partitions, structural columns and door frames of the primary module, while selected appliances, a ducted central air-conditioning unit, an exhaust system for eliminating toxic radon gas, cabinets, fixtures and accessories are installed, to complete the primary module. A pair of rectangular slab floor foundation panels similar to the primary module, including wiring, are hinged on each lower longitudinal edge of the primary module, each fitted with a hinged exterior wall panel and folded into an upright position adjacent to the fixed longitudinal edge of the primary module and its accessory partitions and components. Roof trusses, if the building is to have a pitched roof, and accessories are stacked on top of the hinged ceiling/roof panels and the entire package is wrapped in a plastic sheeting for transportation. The primary module is then transported to a permanent construction site, lowered and anchored to the ground or other foundation, or the modules may be placed on top of or adjacent to each other for single level or multi-level construction, whereupon each rectangular hinged slab floor foundation panel is initially pivoted downwardly and secured in place to horizontally extend from the primary module. The respective hinged wall panels are then folded vertically upward and the hinged ceiling/roof panels are unfolded and secured in place, abutting the vertical hinged wall panels, with the hinged ceiling/roof panels positioned parallel to the coplanar hinged slab floor foundation panels to define the adjacent, or side modules or structures. If the building has a pitched roof, roof trusses are then anchored atop the ceiling/roof panels. The remaining precut exterior and interior trim, interior partitions, shelves and accessories are then installed in conventional fashion, to complete the modular structure.

The combination modular structure and affixed components of this invention provides a unique solution to worldwide needs. Because the building is insect, rodent, fire and rot-resistant and can withstand severe hurricane winds, as well as extreme temperatures, it meets the most stringent codes in the world. The use of state-of-the art materials with no use of nails, lumber and masonry provides a modular functional floor plan and sound structure with conventional appearance. The modular construction concept greatly enhances the portability, durability and affordability, as well as the structural and thermal integrity of the modular structure of this invention.

Accordingly, it is an object of this invention to provide a new and improved modular structure, commercial building or structure built and assembled by a new and entirely different construction method.

Another object of the invention is to provide a structure which is constructed by first building integral hinged and folding ceilings and floors for the primary modules, which serve as portable dollies or pallets that can be rolled or moved to selected locations in the factory for relocation of exterior wall panels, and including interior partitions, ceiling/roof panels, a heating and air conditioning unit, a hot water heater, electrical, plumbing and kitchen fixtures and appliances, as well as a radon gas exhaust system. The hinged slab floor foundation panels, exterior wall panels and ceiling/roof panels define adjoining modules by hinging the slab floor foundation panels to the primary module and folding them and the connected wall panels, as well as the ceiling/roof panels against each side and on top of the primary module respectively. The packaged primary module is shipped he permanent job site, ped directly on the ground or other foundation, or on top of each other, and finally, the structure is unfolded to define a complete building or multiple buildings.

Another object of the invention is to build a slab/floor structural foundation panel, including the plumbing, electrical, structural insulation, sub-floor and finish floor covering in a manufacturing plant, which foundation panel is designed to be placed directly on the ground or on a prebuilt foundation at the job site without the necessity of pouring footings, building piers or forming and pouring a slab foundation, to construct single module buildings such as a mobile home, as well as larger buildings requiring multiple modules.

Yet another object of the invention is to provide a strong and durable slab floor foundation and structure to be used for a single structural module such as a mobile home or for hinging and folding one or more additional slab floor foundations on the primary slab floor foundation to define additional connected structural modules for transporting as one; providing a connection for a towing hitch, such as a mobile home hitch, a fifth wheel, or a handover-type hitch; building the portable middle section of the building on the slab floor and foundation and installing structural columns, door frames, partitions and one or more ceiling/roof panels on the slab floor foundation to define a primary module; building similar slab floor foundations having hinged wall panels for hinged attachment to both sides of the primary module; adding plumbing, electrical wiring and fixtures; transporting the primary module to a pre-leveled, permanent building site; lowering the primary module with hinged slab floor foundation panels in a horizontal position on each side of the primary module to the ground or onto a prebuilt alternative foundation, with the respective hinged wall panels upward-standing; unfolding the hinged ceiling/roof panels and securing them in place on the hinged wall panels to define the secondary portions of the building; installing trusses and factory-fabricated of panels when a pitched of is specified; and installing the remaining partitions, appliances and accessories to complete the modular structure, wherein the manufacturing of three modules of approximately the same size, with most major components being full-width and equal to the length and width of the building wherein joints are eliminated, and through the hinging and folding of the two modules at each side of the primary module onto the top and sides of the primary module, the entire building is transported as one at near one third the cost of transporting three modules.

SUMMARY OF THE INVENTION

These and other objects of the invention are provided in a new and improved, portable, durable and affordable modular house, building or structure and a method of constructing the structure, which structure consists of up to three modular units of approximately the same size, with the center module defining the mechanical portion of the rectangular structure and containing the necessary plumbing, electrical wiring, air conditioning and heating ducts and accessory equipment, including radon gas exhaust system, in the slab floor foundation, walls, ceiling and partitions, respectively. The slab floor foundation and ceiling/roof panels for the optional side modules are built on the same pattern, but omitting the plumbing. Walls are complete with doors and windows installed, and are finished on both sides and built full-width and length, without joints, and partitions are not necessarily full length or width. The center or primary module is completely finished at the factory with cabinets, bath and kitchen fixtures and accessories, a radon exhaust and elimination system and the heating and air conditioning unit or units are installed in accordance with a full-sized floor plan printed on the protective cover of the floor. The ceiling/roof panels and slab floor foundation panels connected to the exterior wall panels, extend the length of the building and are folded on top and against each side, respectively, of the primary module. If a pitched roof is specified, trusses and roof panels are stacked on top of the folded ceiling/roof panels on the primary module, along with gable wall and other accessories (not illustrated) and the module is waterproofed for shipping. These three-in-one modules, consisting of a complete house, commercial building, or other structure, are shipped to the jobsite in folded configuration for the transportation cost of a single structure, plus possibly slight excess weight costs. Deployment includes unfolding and securing the hinged slab floor foundation panels in a horizontal position on each side of the completed center module and positioning the connected hinged wall panels upwardly in vertical configuration; unfolding the two ceiling/roof panels in opposite directions and securing them in place abutting the hinged wall panels; and installing the exterior gable walls, which were transported loose. If the building has a pitched roof, the trusses and roof panels are then installed and the remaining accessories in the modular building are added.

The invention will be better understood by reference to the accompanying drawings, wherein:

FIG. 1 is an isometric view of a factory work table, a paper or plastic sheet with a selected floor plan printed on the bottom side, a plastic flooring sheet lying between the floor plan sheet and a sub-floor, for constructing the middle subfloor foundation section of the center module element of the modular structure;

FIG. 2 is an isometric view of the work table and slab floor foundation illustrated in FIG. 1, more particularly illustrating installation of a rectangular structural frame around the work table perimeter for receiving plumbing, wiring and foam insulation within and adding wheels or casters on the frame;

Figure 12:
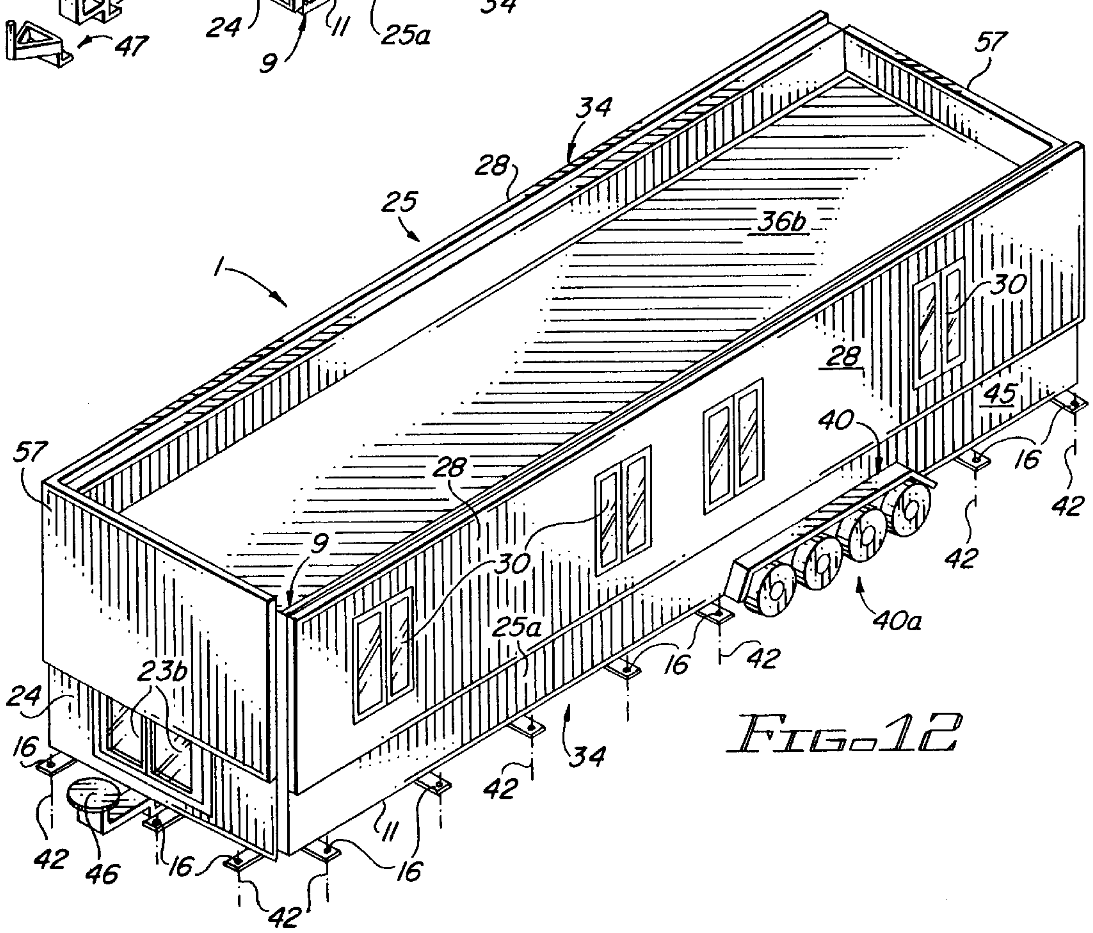
FIG. 12 is an isometric view of the primary module, with ceiling/roof panels removed for brevity, more particularly illustrating folding of the primary module hinged floor and wall assemblies into transportation mode.
Figure 13:
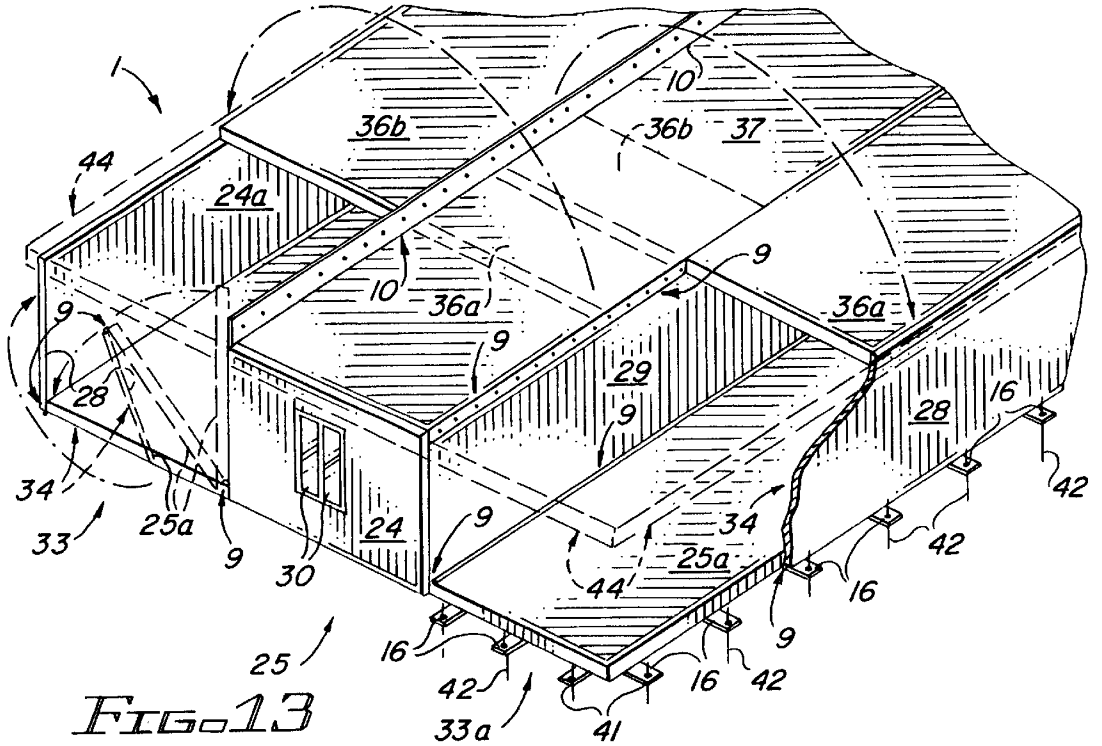
Figure 14:
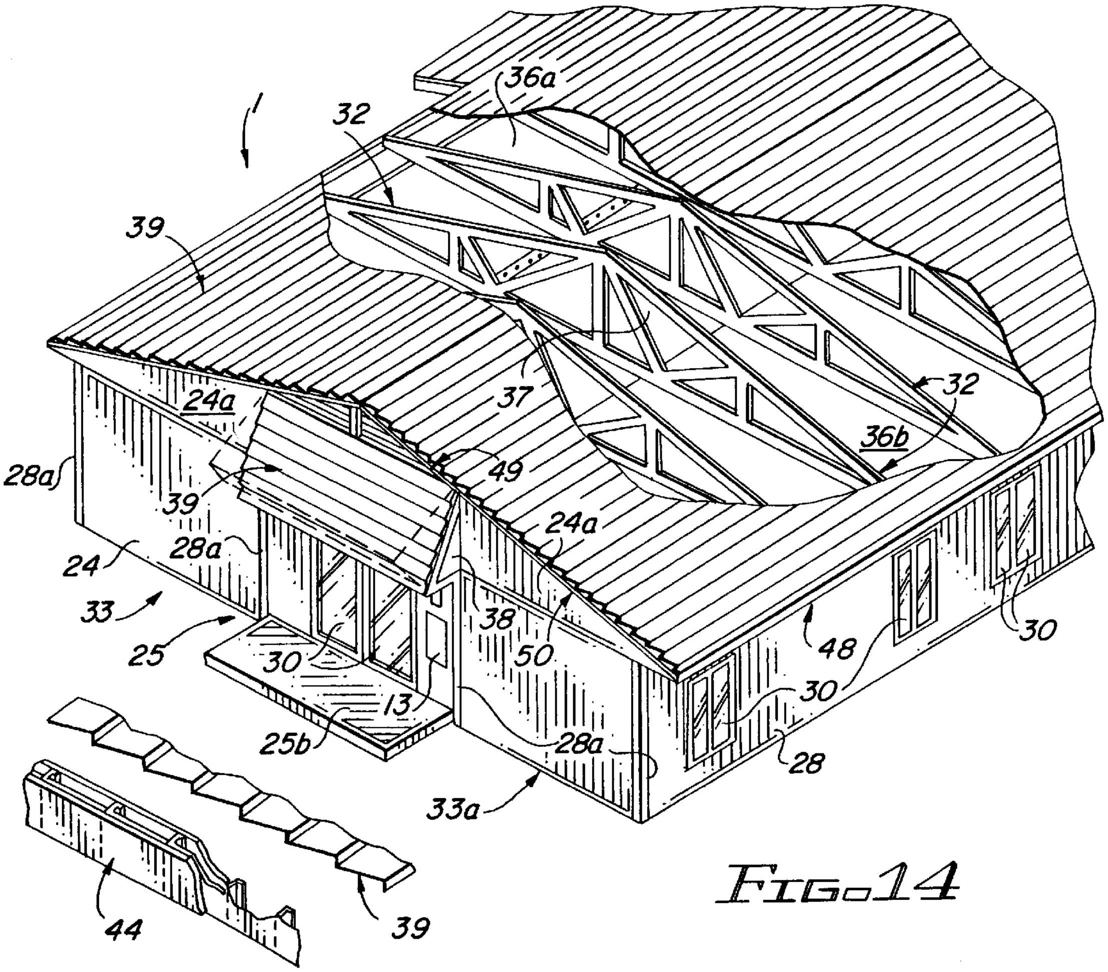
Figure 15:
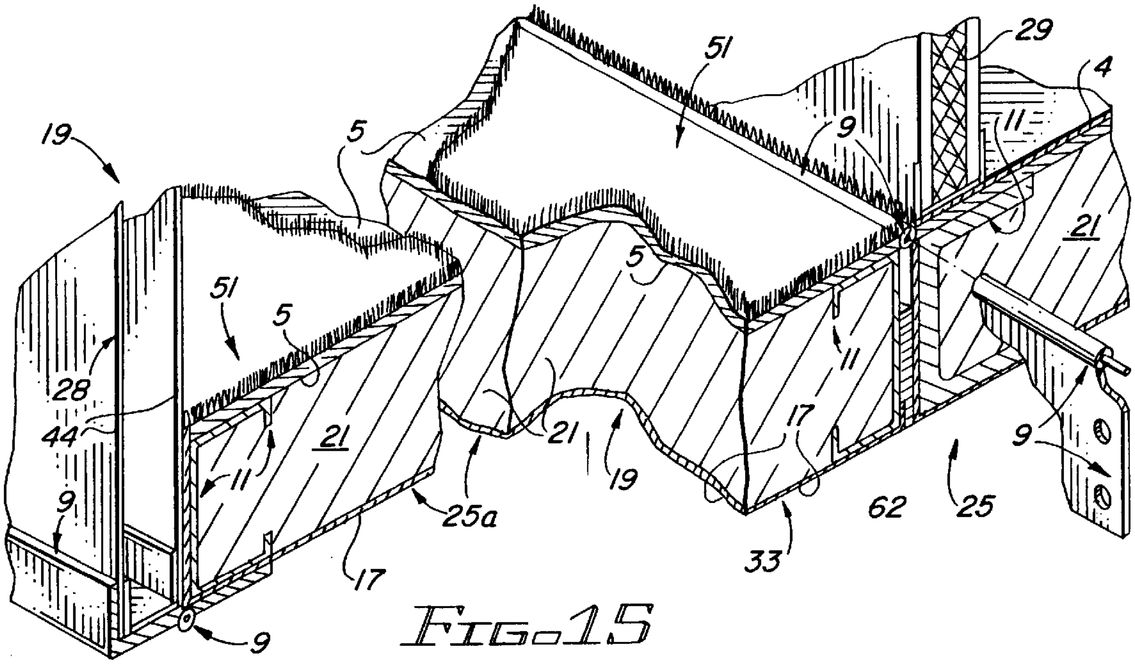
Figure 16:
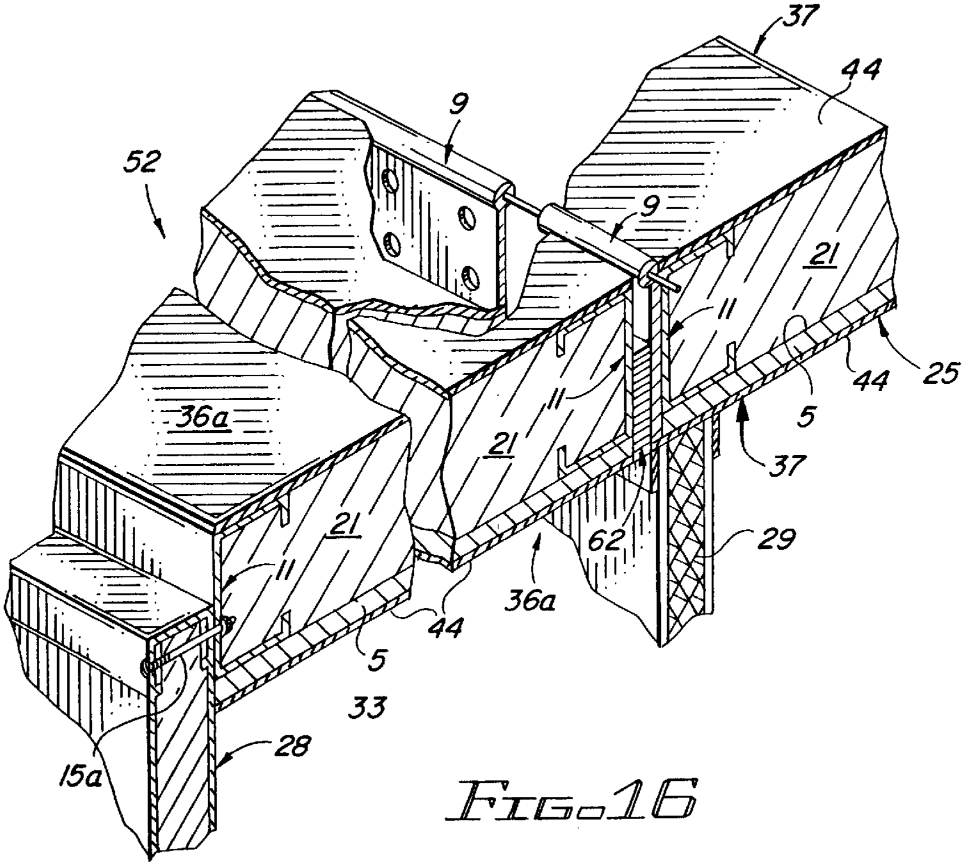
Figure 17:
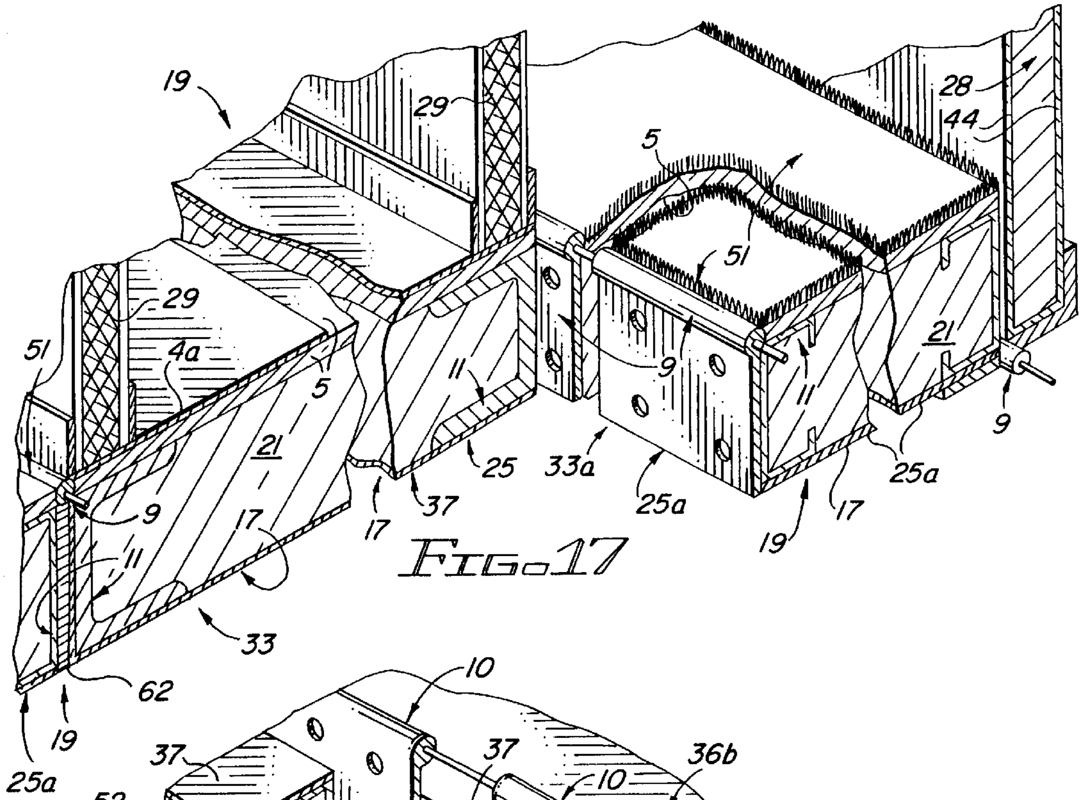
Figure 18:
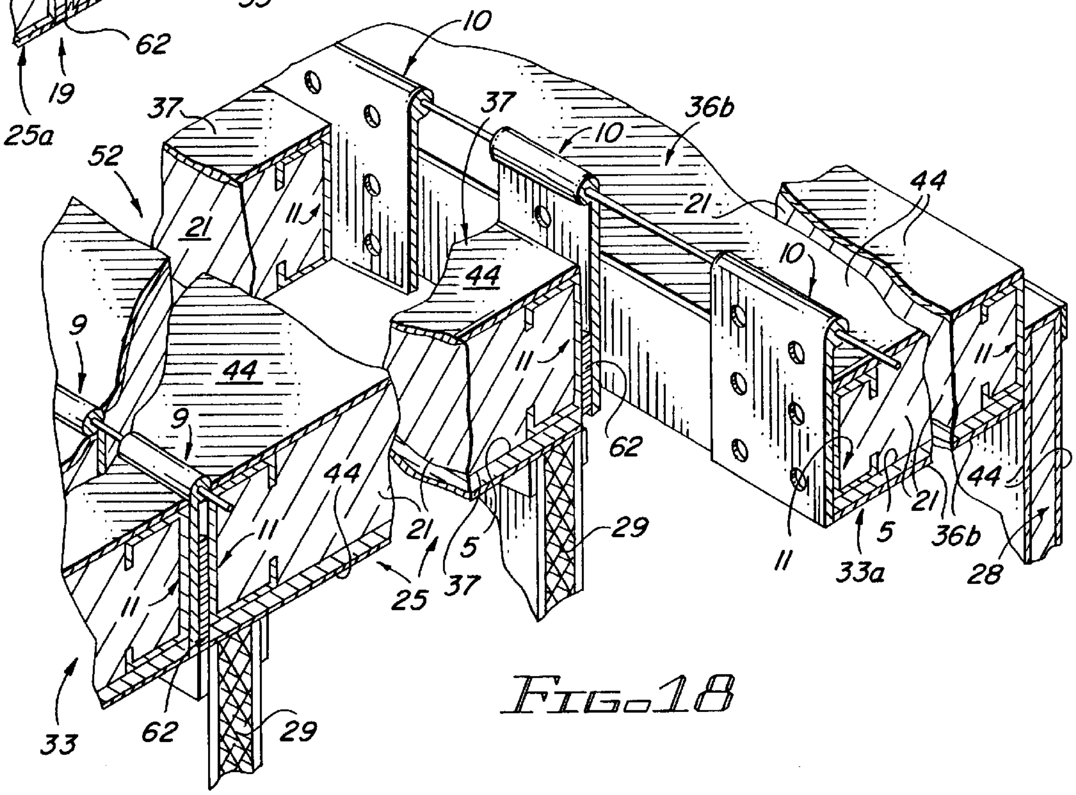

FIG. 13 is an isometric view of the primary module, reversed 180 degrees end-to-end from the primary module position illustrated in FIG. 12, more particularly illustrating unfolding and deployment of the respective slab floor foundation panels, wall panels and ceiling/roof panels into functional configuration to define the auxiliary component assemblies or side modules in the structure of this invention;

FIG. 14 is an isometric view, partially in section, of a preferred embodiment of the completed structure, particularly illustrating application of roofing and roof framing installed at the job site;

FIG. 15 is an isometric sectional view of one side of an erected floor section of a side component assembly or side module attached to the primary module slab floor foundation module;

FIG. 16 is an isometric sectional view of one side of an erected ceiling section of a side module, more particularly illustrating the unique hinging arrangements;

FIG. 17 is an isometric sectional view of the primary module floor foundation of the opposite side of the erected floor section of the secondary component assembly or side module; and FIG. 18 is an isometric sectional view of the primary module and the opposite side of the erected ceiling section of the secondary component assembly or side module.

DESCRIPTION OF THE PREFERRED EMBODIMENTS

Referring initially to FIG. 1 of the drawings, the rectangular middle subfloor foundation section 2 of the center module element of the modular structure 1 is constructed by first deploying an elongated, flat rectangular paper or vinyl wear sheet 4*b* from a roll, face down on a suitable surface such as an elongated, rectangular table 3. The exposed bottom surface of the wear sheet 4*b* is imprinted with a full scale floor plan layout, hereinafter further described, for a center module 25 which will be constructed on the wear sheet 4*b*. An elongated, rectangular vinyl flooring sheet 4 is stretched from a vinyl flooring roll 4*a* on top of the wear sheet 4*b* and is edge-glued to the wear sheet 4*b* so that the vinlyl flooring sheet 4 and the wear sheet 4*b* form a temporary laminate on the table 3. Multiple plywood panel sheets or sub floor units 5 are then stacked end-to-end on top of the vinyl flooring sheet 4 in edge-to-edge relationship, as illustrated in FIG. 1 to define an initial assembly portion of the floor and foundation of the center module 25.

Referring now to FIG. 2 of the drawing, equipment openings 7 are cut in selected locations in the sub floor units 5 near the center of the center module 25 as illustrated and an elongated electrical outlet notch 8 is also cut in one of the subfloor units 5 for installation of electrical wiring (not illustrated). Subfloor notches 8*a* are also cut in the subfloor units 5 in spaced relationship with respect to the perimeter of the center module 25 to further accommodate the electrical wiring, as hereinafter described. Caster wheels 26 are pivotally attached to the subfloor units 5 in spaced relationship and pivoting steel anchor plates 16 are mounted in a rectangular structural frame 11, which is sized to fit around the perimeter of the subfloor units 5 to further define the center module 25. Accordingly, the structural frame 11, fitted with multiple pivoting anchor plates 16, is seated on the subfloor units 5 and bolted in place.

Figure 3:
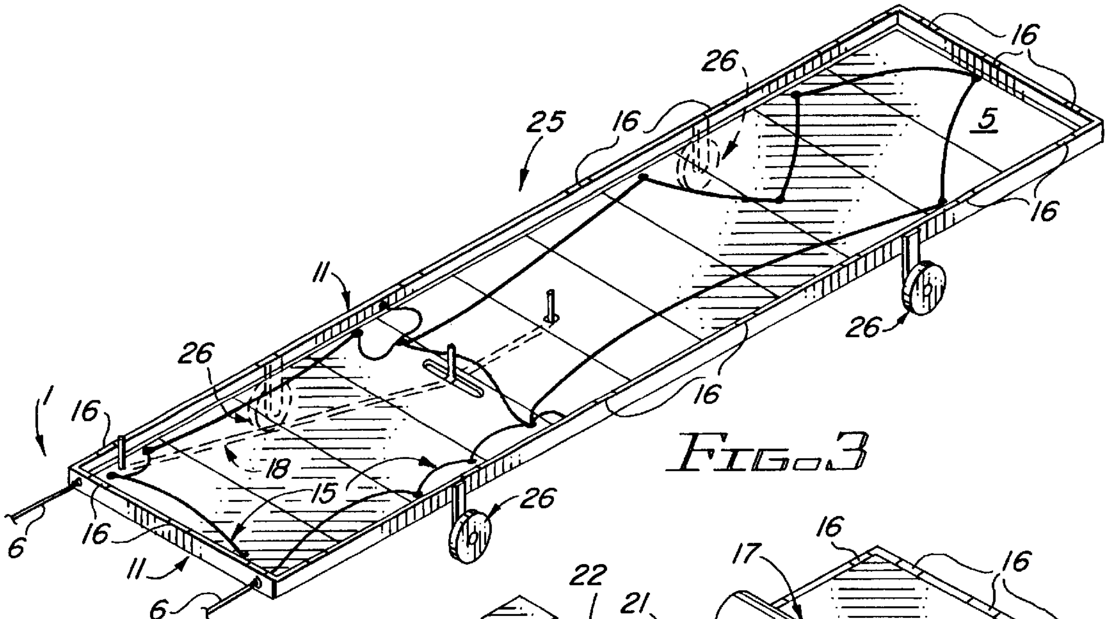
FIG. 3 is a perspective view of the slab floor foundation removed from the work table, which is replaced by the wheels or casters, and installation of plumbing and wiring rough-ins within the frame on the subfloor.

Referring now to FIG. 3 of the drawing, the center module 25 as defined and illustrated in FIG. 2 is fitted with sewer and water pipes 18 and electrical wiring 15, which electrical wiring 15 and sewer and water pipe 18 are secured to the subfloor units 5 by adhesive foam and suitable fasteners known to those skilled in the art. It will be appreciated that the center module 25 has been removed from the table 3 illustrated in FIG. 2 and is now free-standing on the respective caster wheels 26. An electrical and plumbing stub-out stub 6 also extend from one end of the structural frame 11, as further illustrated in FIG. 3 for site extension of utilities.

Figure 4:
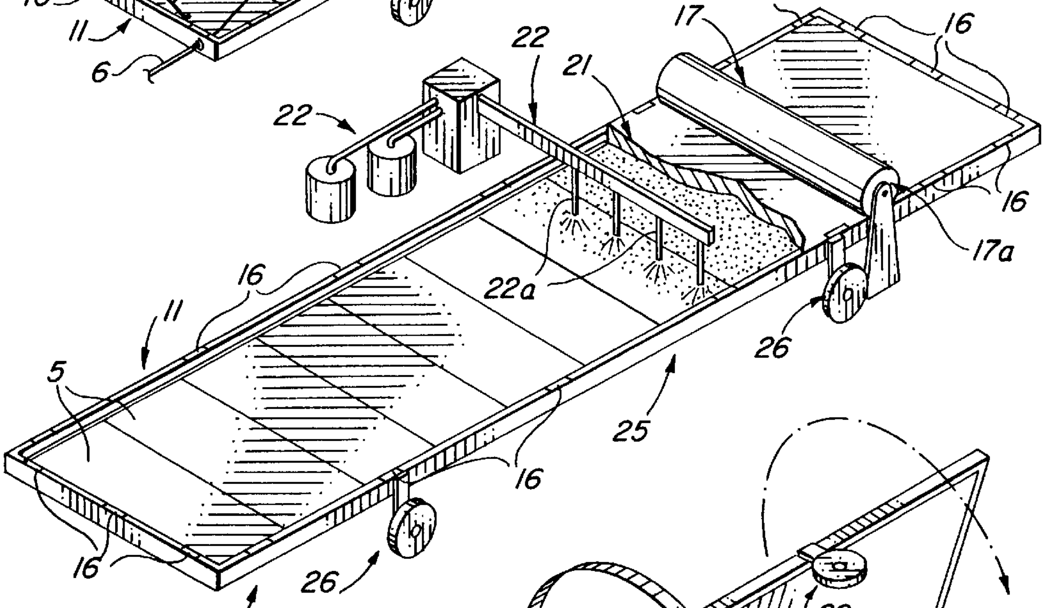
FIG. 4 is an isometric view of the slab floor foundation illustrating application of structural foam insulation and a plastic cover sheet.

Referring now to FIG. 4 of the drawings, the center module 25 is subsequently rolled down an assembly line into alignment with an insulation applicator 22 and is positioned beneath a series of applicator heads 22*a* for application of structural installation 21. In a preferred embodiment of the invention the insulation applicator 22 operates to dispense the insulation 21 in liquid form from the respective applicator heads 22*a* and as the center module 25 is slowly rolled beneath the applicator heads 22*a*, the liquid insulation is sprayed directly on the subfloor units 5 and expands and solidifies. The structural insulation 21 is applied to the subfloor units 5 along the entire length of the center module 25, thus bonding the subfloor units 5 to the structural frame 11, as well as further securing the electrical wiring 15 and the sewer and water pipe 18 in place. A flexible plastic vapor barrier 17 is extended from a barrier roll 17*a* over the structural insulation 21 as the center module 25 is slowly rolled beneath the barrier roll 17*a* and the applicator heads 22*a* of the insulation applicator 22. It will be appreciated by those skilled in the art that the structural insulation 21 may be characterized by a free rising spray foam similar to polyurethane or optionally, a high pressure conveyed spray foam of the type that is normally applied to exterior walls and interior partitions in the construction industry, according to the knowledge of those skilled in the art.

Figure 5:
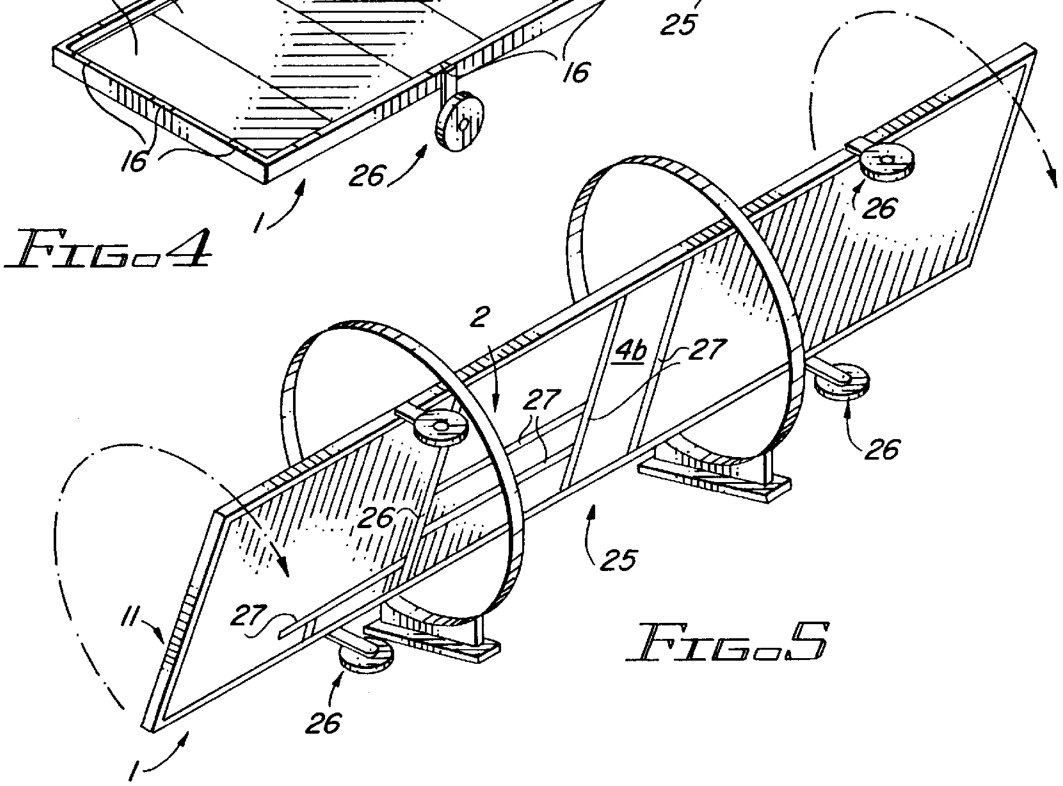
FIG. 5 is a perspective view of the slab floor foundation and casters being reversed 180° for additional travel through the assembly line.

Referring now to FIG. 5 of the drawings, after application of the structural insulation 21 and full and complete expansion of the structural insulation 21 inside the structural frame 11, the center module 25 is rotated 180 degrees and the caster wheels 26 are pivotally repositioned on the structural frame 11 to facilitate positioning of the wear sheet 4*b* in an upwardly exposed configuration to define the wall and partition pattern 27, imprinted on the wear sheet 4*b*.

Figure 6:
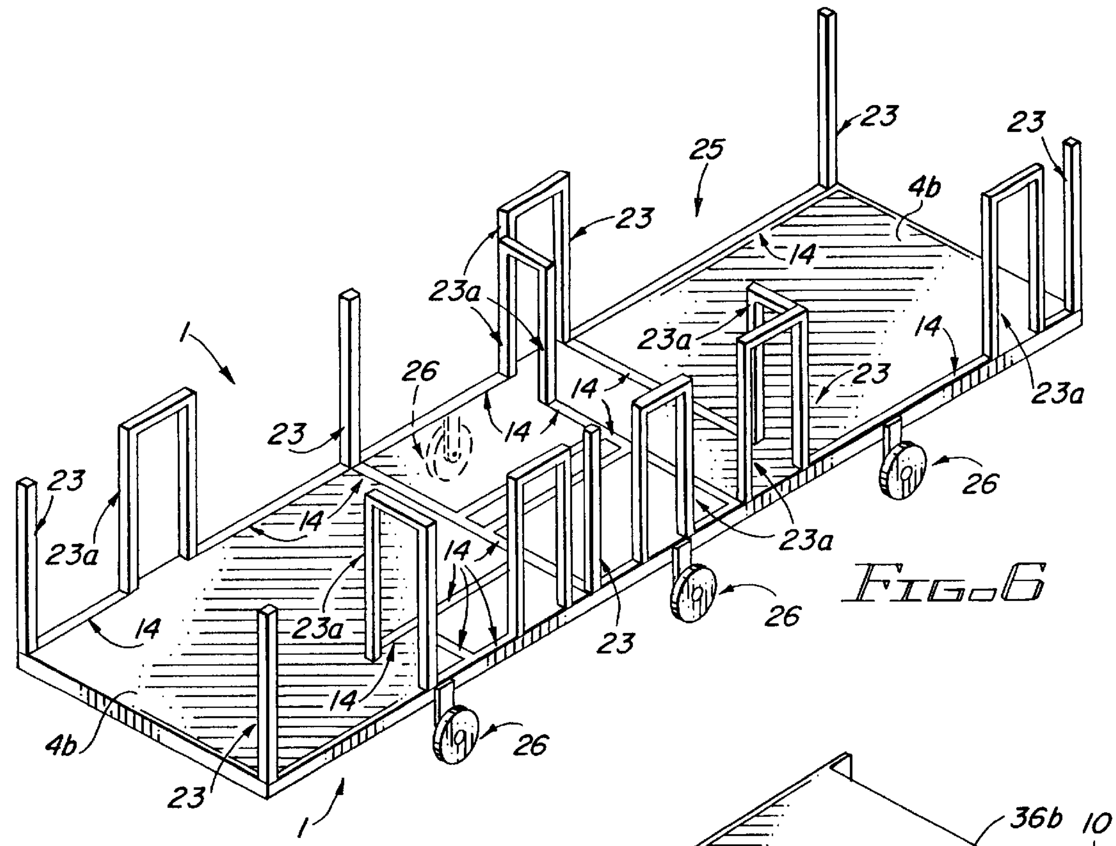
FIG. 6 is an isometric view of the reversed slab floor foundation, illustrating layout of exterior and interior doors and frames, according to the preprinted floor plan layout installed as indicated in FIG. 1.

Referring now to FIG. 6 of the drawings, the structural columns 23, including door frames 23*a*, are bolted to channel-shaped base runners 14, in turn bolted to the structural frame 11 and subfloor units 5, according to the pre-imprinted wall and partition pattern 27 on the wear sheet 4*b*. Accordingly, completion of the respective structural column 23 and door frames 23*a* forms the basic floor plan structure of the center module 25, as illustrated in FIG. 6. In a preferred embodiment of the invention two additional caster wheels 26 are then bolted to the structural frame 11 of the center module 25 in order to support the additional load represented by the respective structural columns 23 and door frames 23*a*. In a most preferred embodiment of the invention each of the structural columns 23 and door frames 23*a* are bolted to the structural frame 11 and the base channel runners 14 and prehung doors 23*b* may be provided on the respective door frames 23*a*. Additional base channel runners 14 may be mounted on the tops of the structural columns 23 and door frames 23*a* for strengthening purposes.

Figure 8:
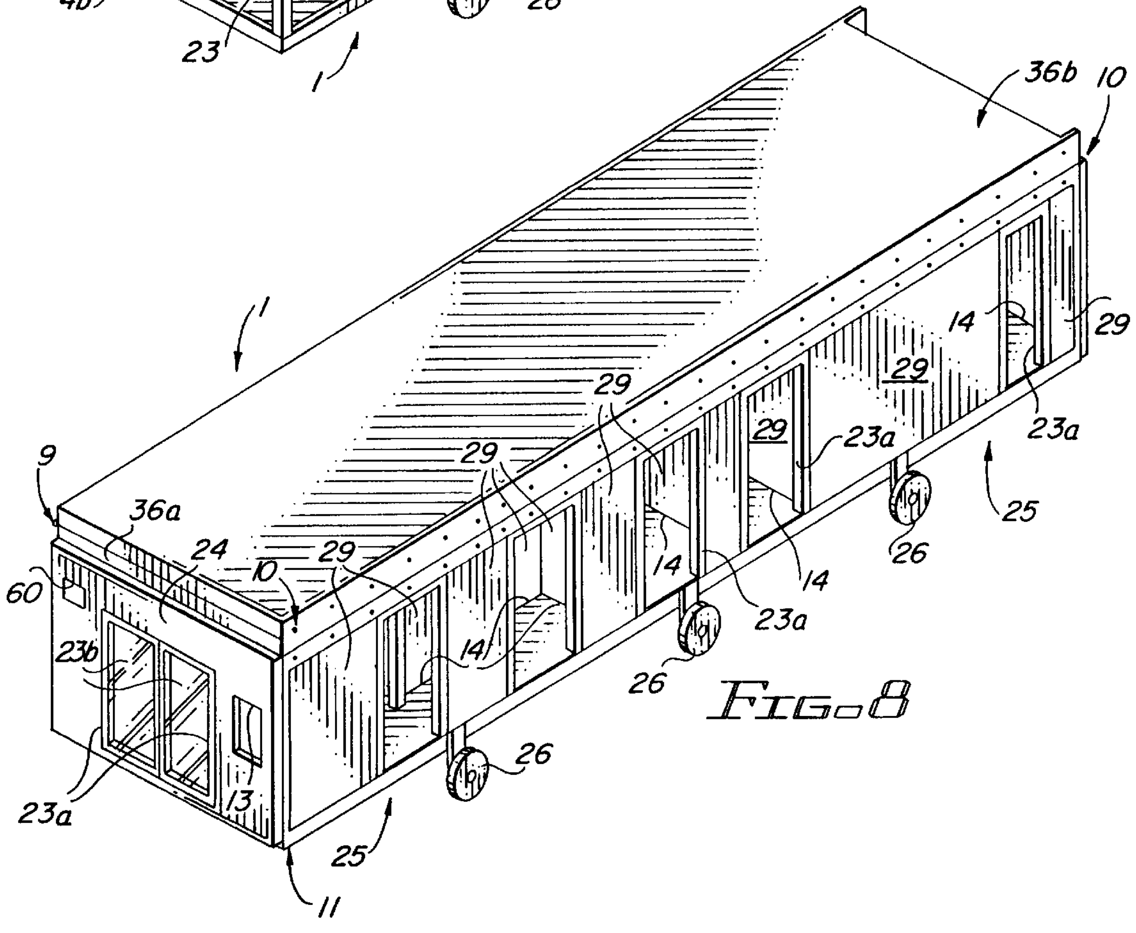
FIG. 8 is an isometric view of the primary module illustrated in FIG. 7, illustrating the extended width hinge and an end wall, with doors and an electrical panel, a dryer and radon system vent and plumbing stub-out.
Figure 7:
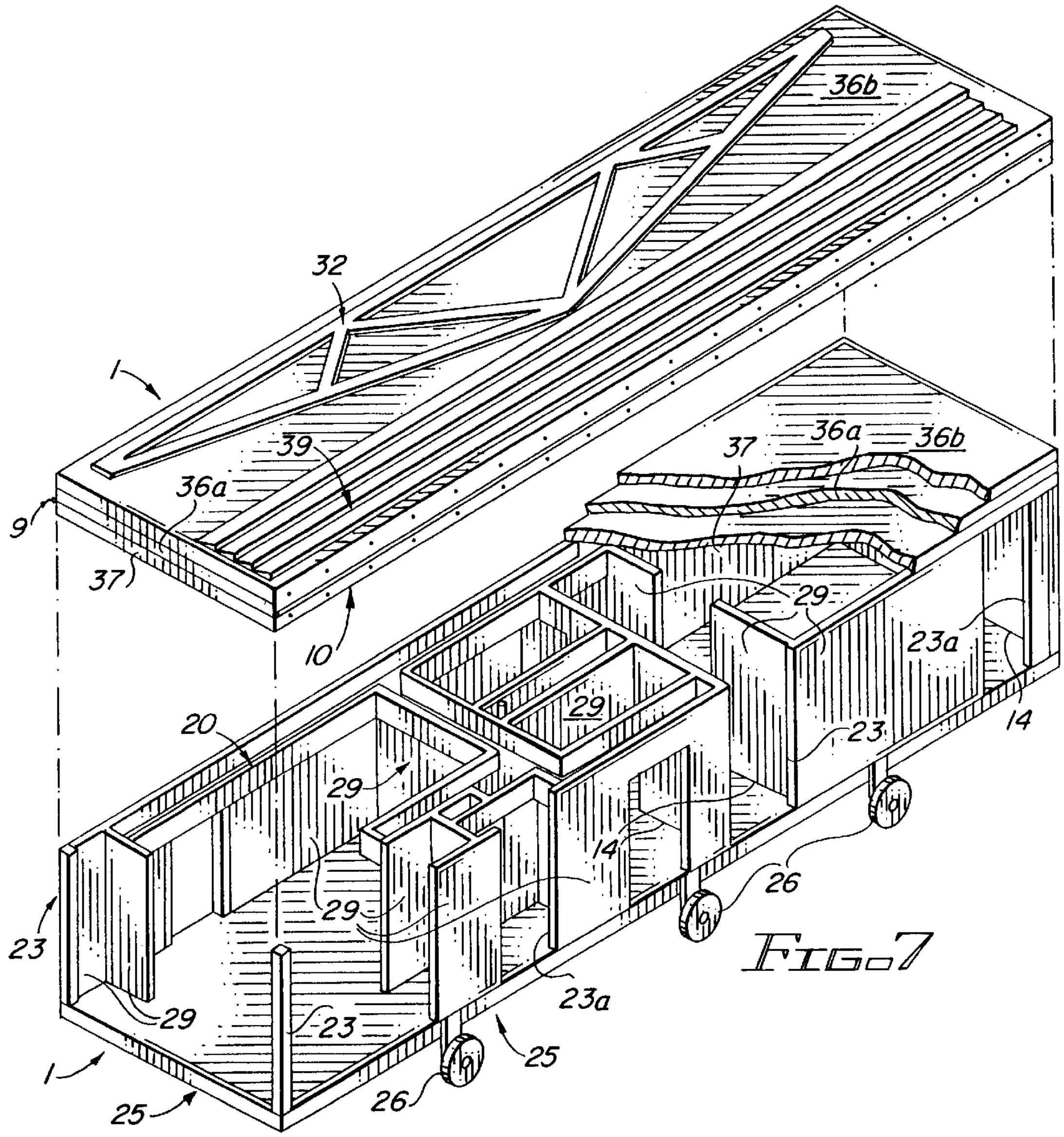
FIG. 7 is an isometric exploded view of a completed center or primary module built on the slab floor foundation and fitted with some of the components for the two adjoining modules, atop the folding, hinged ceiling/roof panels, to be transported to the proposed site.

Referring now to FIGS. 7 and 8 of the drawings, after the structural columns 23 and door frames 23*a* are mounted on the structural frame 11 and the base channel runners 14 according to the pre-printed wall and partition pattern 27 on the wear sheet 4*b*, end walls 24 and partitions 29 are bolted in place on the structural columns 23 and door frames 23*a*. Typically, the partitions 29 are fabricated of honeycomb-core, sandwiched panels finished by single-wythe panelling on each side and constructed of a variety of available material, according to the knowledge of those skilled in the art. For example, the partitions 29 may be fabricated in a high pressure conveyor system with minute tolerances and are typically non load-bearing, of the post-and-beam structural design. End walls 24 are similarly fabricated but are diaphragm-frame load-bearing in design. As further illustrated in FIG. 7, a first hinged ceiling panel 36*a* and second hinged ceiling panel 36*b* are stacked and hinged on a fixed ceiling section 37, as hereinafter described. The fixed ceiling section 37 closes the top of partitions 29 of the center module 25 and the upper side of the end walls 24. The first hinged ceiling panel 36*a* and second hinged ceiling section 36*b* are hinged along the entire length of opposite edges of the fixed ceiling section 37 by means of a connector panel hinge 9 and an extended width hinge 10, respectively, as hereinafter further described. When the first hinged ceiling panel 36*a* and second hinged ceiling panel 36*b* are folded in hinged configuration on the fixed ceiling section 37 as illustrated in FIG. 7, roof trusses 32 can be stacked on the second hinged ceiling panel 36*b*, along with individual panels of the roofing 39 and various other items and accessories to be transported to the job site.

Referring again to FIG. 8 of the drawings, the first hinged ceiling panel 36*a*, second hinged ceiling panel 36*b* and fixed ceiling section 37 are illustrated in place on the center module 25, with the end walls 24 bolted in place. As in the case of the center module 25 illustrated in FIGS. 1–7, the center module illustrated in FIG. 8 retains the caster wheels 26 to effect continued mobility of the center module 25 through the assembly line.

Figure 9:
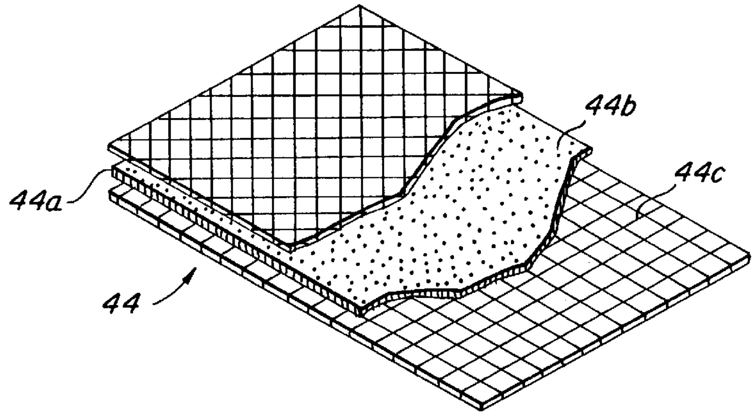
FIG. 9 is an isometric view, partially in section, of a laminated insulated blanket to be installed on end walls, side walls, floor panels, ceiling and ceiling/roof panels.

Referring now to FIGS. 9, 16 and 18 of the drawings, in another preferred embodiment of the invention a flexible blanket 44 is illustrated, having an exterior wythe 44*a*, a center wythe 44*b* and an interior wythe 44*c* that are laminated together for insulation, pest-control and structural purposes. In a preferred embodiment of the invention the exterior wythe 44*a* is characterized by a nylon net, the center wythe 44*b* is a fiberglass matte and the interior wythe 44*c* is a scrim kraft material. The layers are gathered in rolls and compressed into a laminated blanket, which is then saturated in a ceramiclatex/acrylic liquid and directed through sizing rollers and oven-heated to form a highly insulated, flame resistant, fireretardant blanket. The blanket is then extensively air dried by conveyor, cut into lengthy rolls and glued to the top and bottom surfaces of the fixed ceiling section 37, first hinged ceiling panel 36*a*, second hinged ceiling panel 36*b* and each side of the end walls 24 and side walls 28, as illustrated in FIGS. 9, 16 and 18.

Figure 10A:
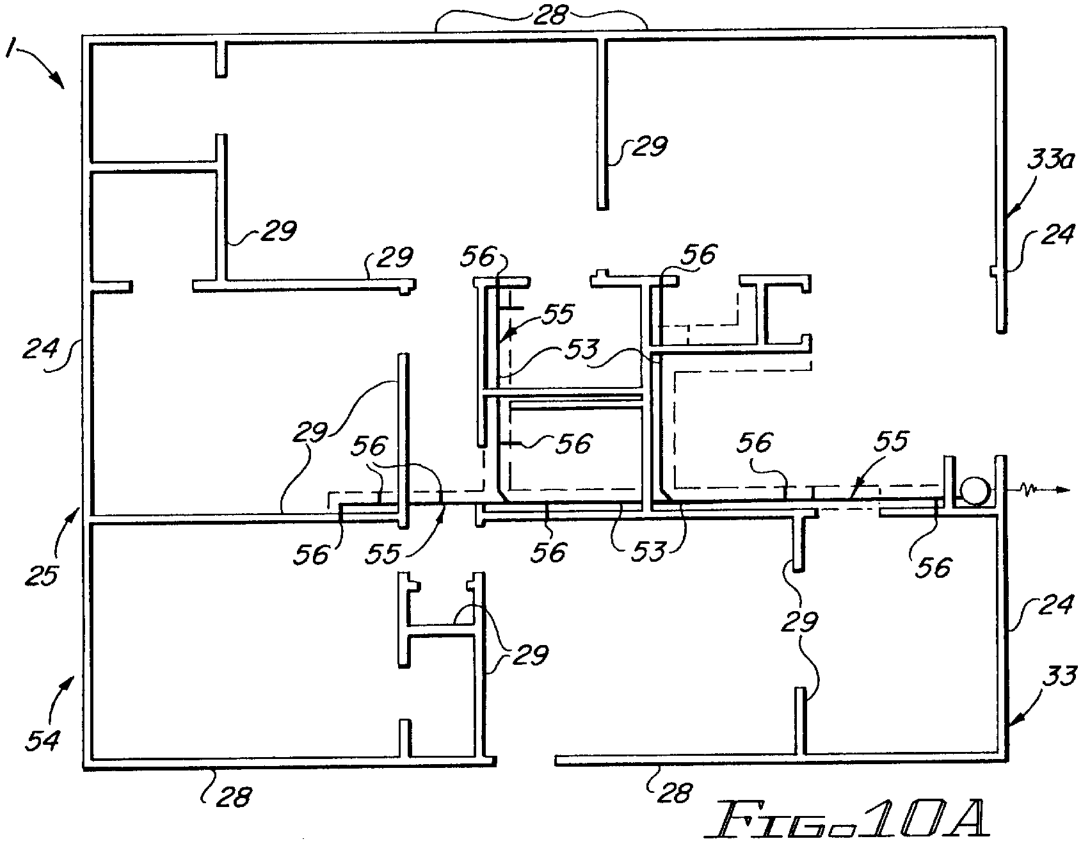
FIG. 10A is a plan view of typical floor plan of the structure as deployed on-site, illustrating a typical radon gas elimination system.
Figure 10B:
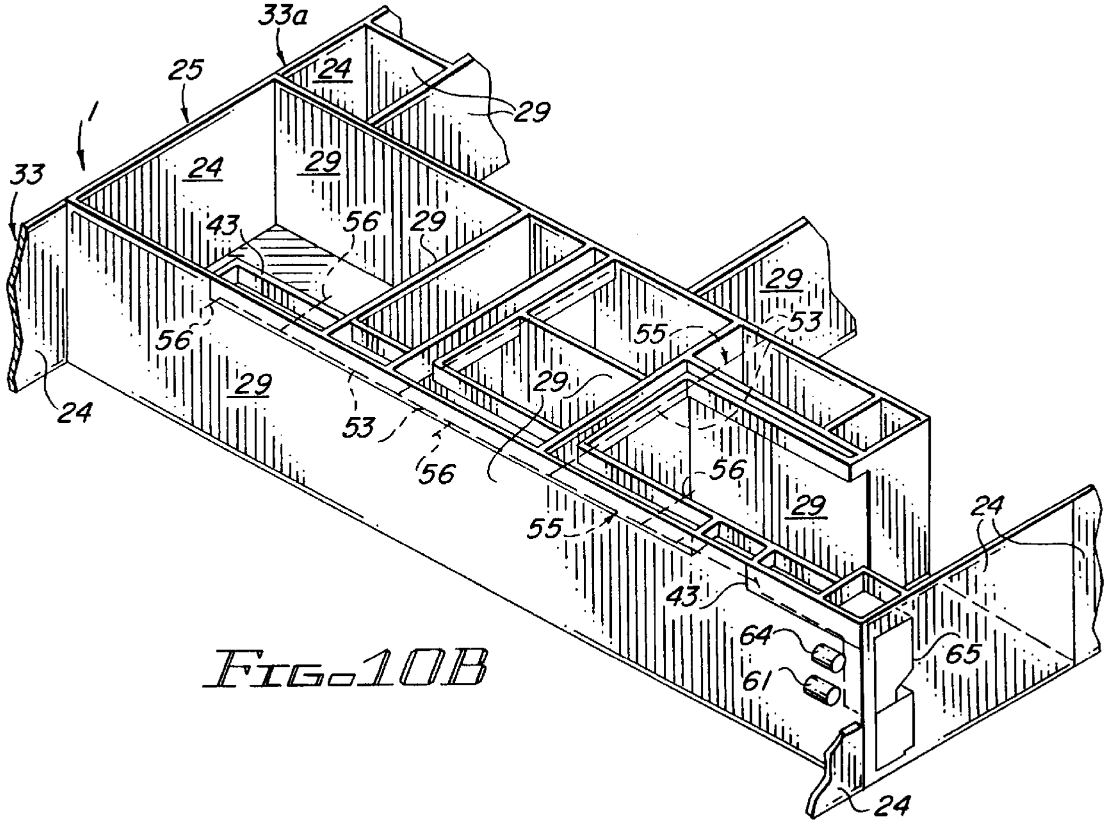
FIG. 10B is an isometric view, partially in section, of the radon gas elimination system illustrated in FIG. 10A.

Referring now to FIGS. 10A and 10B of the drawings, in a most preferred embodiment of the invention a radon gas exhaust system 55 is illustrated, wherein room exhaust ports 56 are provided at spaced intervals in radon exhaust piping 53 to remove radon gas which may enter the modular structure 1. Accordingly, referring to the floor plan 54 illustrated in FIG. 10A and the isometric sectional view 10B of the center module 25 with the ceiling sections 37 and hinged floor and wall assemblies 34 removed for brevity, it will be appreciated that the radon gas exhaust system 55 operates to exhaust each of the respective rooms in the modular structure 1 of radon gas and effect an air exchange in those rooms independently of the air conditioning system (not illustrated) which is later installed in the modular structure 1. Poison radon gas which may enter the modular structure 1 travels through the sealed, flexible radon exhaust piping 53, located within the air conditioning ductwork 43 and is dually exhausted by an automatic clothes dryer fan 61, located in a clothes dryer 65, in association with a nearby radon exhaust standby fan 61, as illustrated in FIG. 10B.

Figure 11:
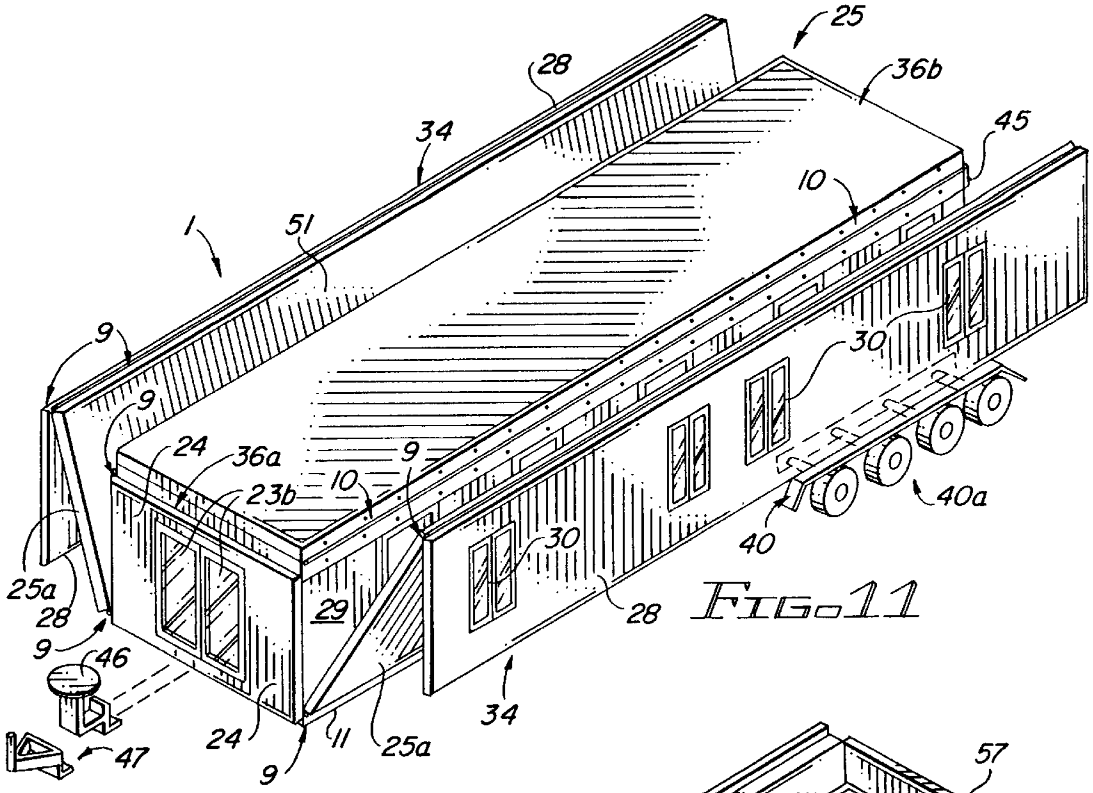
FIG. 11 is a perspective view of the primary module, more particularly illustrating folding and unfolding of the hinged slab floor foundations and wall panels of the secondary, or side modules, from the primary module.

Referring now to FIGS. 11 and 13 of the drawings, as heretofore described, the second hinged ceiling panel 36*b* is hinged to the underlying fixed ceiling section 37 along one side of the center module 25 by means of the extended width "(high boy)" hinge 10. Similarly, the first hinged ceiling panel 36*a* is hinged to the fixed ceiling section 37 by means of the connecting panel hinge 9 along the opposite side of the center module 25. Furthermore, two hinged floor and wall assemblies 34 each include a floor panel 25*a*, hinged at the bottom edge by means of a connecting panel hinge 9, to a corresponding partition 29 of the center module 25 and an end wall 24, bolted along one edge thereof to the free edge of the floor panel 25*a*. Windows 30, as well as doors (not shown) may be provided in the respective side walls 28, as well as doors 31 in the end walls 24 of the center module 25, as desired.

Furthermore, referring to FIG. 11, a fifth wheel 46 may be attached to the frame 11 of one end of the center module 25 at one of the end walls 24 or an alternative towing device such as a trailer hitch illustrated by reference numeral 47, may be attached at the corresponding end wall 24, as desired, for towing the modular structure 1 using a suitable truck or tractor (not illustrated), as hereinafter further described. Moreover, as illustrated in FIG. 8, the caster wheels 26 have been unbolted from the structural frame 11 of the modular structure 1 and in their place, tandem wheels 40*a* have been mounted on the structural frame 11, along with fender skirts 40, as further illustrated in FIG. 11. Brake lights 45 may also be installed on the opposite end of the center module 25 from the fifth wheel 46 or the towing device 47, for enhanced visibility during towing of the modular structure 1 on the highway.

Referring now to FIG. 12 of the drawings, the hinged floor and wall assemblies 34 on each side of the center module 25 are positioned in folded configuration and the fixed ceiling section 37, installed along with the second hinged ceiling panel 36*b* and first hinged ceiling panel 36*a*. In addition, travel end walls 57 are temporarily secured in place on the respective end walls 24 of the center module 25 to contain the respective roof trusses 32 and roofing 39 as well as other components and accessories in position on top of the second hinged ceiling panel 36*b*, as illustrated in FIG. 7 and hereinafter further described. It will be appreciated that the fifth wheel 46 is illustrated in functional position mounted on the center module 25 for receiving the corresponding attachment apparatus (not illustrated) on a trailer or truck (not illustrated) for travelling the modular structure 1 on the highway. The entire structure is then wrapped in a waterproof sheeting such as polyethylene (not illustrated) and is ready for transportation.

Referring now to FIGS. 12 and 13 of the drawings, the on-site erection of modular structure 1 is accomplished by initially positioning the center module 25 on a pre-prepared, level foundation (not illustrated) and unfolding the hinged floor and wall assemblies 34 such that the respective side walls 28 are pivoted upwardly from the corresponding horizontally-positioned floor panels 25*a*. The first hinged ceiling pane 36*a* is folded on the connecting panel hinge 9 to abut and bear against the sidewall 28 on one side of the center module 25, after the second hinged ceiling panel 36*b* is folded on the extended width panel hinge 10 to abut and bear on opposite sidewall 28 on the opposite side of the center module 25. This deployment of the respective hinged floor and wall assemblies 34 and the first hinged ceiling panel 36*a* and second hinged ceiling panel 36*b* defines the first side module 33 and the second side module 33*a*. The center module 25, first side module 33 and second side module 33*a* are then anchored by positioning the pivoting anchor plates 16 outwardly as illustrated and driving anchor spikes 42 through openings in the pivoting anchor plates 16, into the underlying earth foundation.

Referring now to FIG. 14 of the drawings, after the hinged floor and wall assemblies 34 and first hinged ceiling panel 36*a* and second hinge panel 36*b* have been deployed as illustrated in FIG. 13, the end walls 24 and gable walls 24*a* are bolted in place and the roof trusses 32 are aligned in position spanning the center module 25, including the coplanar fixed ceiling section 37, first hinged ceiling panel 36*a* and second hinged panel 36*b*, as illustrated. Roofing 39 is then applied in metal sheets, typically three to four feet wide, full roof length, with neoprene-capped mollie-bolt anchors (not illustrated) over the roof trusses 32. A metal wall louver 49 is installed on each end of the modular structure above the end walls 24 and metal rake trim 50 is installed at the edges of the roofing 39 on each end of the modular structure 1, as illustrated in FIG. 14. A combination facia/soffitt 48 is also installed along the outside eaves of the roofing 39 between the roofing 39 and the corresponding walls 28, as further illustrated in FIG. 14. A porch floor 25*b* may also be added in front of the end wall 24 of the center module 25 and at the front door in the sidewall 28 (not illustrated). Corner trim 28*a* may also be added at each corner of the modular structure 1 as further illustrated in FIG. 14. A triangular-shaped porch roof 38, with metal roofing 39, is hinged to the respective end walls 24 below the metal attic louver 49 and provides lockable attic access. The facia/soffits 48 and gable walls 24*a*, similar to the end walls 24, complete the enclosure.

Referring next to FIGS. 15 and 17 of the drawings, an erected floor section 19 of the modular structure 1 is illustrated in section, more particularly illustrating the folding of the floor panels 25*a* on the respective connecting panel hinges 9 into alignment with the foundation of the center module 25. Carpet 51, previously applied to the upper facing surface of the floor panel 25*a*, is illustrated and the corresponding side walls 28 are upward-standing from the outside edges of the horizontal floor panels 25*a* to define the respective first side module 33 and second side wall 33*a* on both sides of the center module 25. Filler blocking 62 may be inserted at the respective connecting panel hinges 9 and extended width hinge 10, as illustrated in FIGS. 15–18. As further illustrated in FIG. 15, the upward-standing side walls 28 are hinged to the horizontal floor panels 25*a*, respectively, by means of a second connecting panel hinge 9. Accordingly, each of the hingedlyextended, horizontally-oriented floor panels 25*a* bear on the foundation ground that was prepared for the foundation portion of the center module 25, so that the entire foundation of the modular structure 1 anchors to the ground or anchors to a suitably levelled, horizontally compacted and previously prepared foundation (not illustrated). As in the case of the foundation portion of the center module 25 which includes a structural frame 11, each of the floor panels 25*a* in the first side modules 33 and second side modules 33*a* are preferably constructed using a structural frame 11 with subfloor units 5 mounted on the top thereof and a vapor barrier 17 closing the bottom of the floor panels 25*a*.

Referring now to FIGS. 16 and 18 of the drawings, opposite sides of the modular structure 1 are illustrated in isometric section, more particularly delineating the out wardly-folding configuration of the first hinged ceiling panel 36*a* and the second hinged ceiling panel 36*b* from the fixed ceiling section 37, which serves as a ceiling or top portion of the center module 25. The first hinged ceiling panel 36*a* and second hinged ceiling panel 36*b* are hingedly connected to opposite edges of the center module 25 at the fixed ceiling section 37 by means of the connecting hinge 9 and the extended width hinge 10, respectively, as heretofore described. Accordingly, as illustrated in FIG. 16, the first hinged ceiling panel 36*a* is extended from the fixed ceiling section 37 by means of a connecting panel hinge 9 which extends the entire length of the center module 25 and the fixed ceiling section 37. Similarly, referring to FIG. 18, the second hinged ceiling panel 36*b* is extended from the opposite edge of the center module 25 at the fixed ceiling section 37 along the entire length of the center module 25 and the fixed ceiling section 37 by means of the extended width hinge 10. Cooperation between the connecting panel hinge 9 and the extended width hinge 10 facilitates folding of the first hinged ceiling panel 36*a* and the second hinged ceiling panel 36*b* from coplanar relationship with respect to the fixed ceiling section 37 back into stacked configuration for transportation or retransportation purposes, as heretofore described. Each of the first hinged ceiling panel 36*a* and second hinged ceiling panel 36*b* are supported by the oppositely-disposed, vertically-oriented and upwardly-hinged side walls 28 respectively, as illustrated.

In a preferred embodiment of the invention and referring again to the drawings, the modular structure of this invention is constructed on an assembly line, as follows. As illustrated in FIG. 1, in a preferred embodiment, three tables 3 are positioned side-by-side in a first assembly area, the first and third tables of which are identical and each include a subfloor 5, fitted with carpet 51 and a wear sheet 4*b*. The second table 3 substitutes the vinyl flooring sheet 4 and wear sheet 4*b* having the wall and partition pattern 27 inscribed thereon, as heretofore described. As further heretofore describe, the wall and partition pattern 27 is designed to facilitate construction of upward-standing partitions 29 at a later point in the assembly line process, as illustrated in FIGS. 6 and 7. Plywood subfloor units 5 are edge taped to the vinyl sheet 4 and the subfloor units 5 extend across the entire length of the table 3. The rectangular structural frame 11 is then assembled and bolted into place on the subfloor units 5 as illustrated in FIGS. 2 and 3, which structural frame 11 then defines upward-standing perimeter edges, permanently bonding the subfloor units 5 and the structural frame 11. Equipment openings 7 and electrical outlet notches 8, as well as subfloor notches 8*a*, are then cut through the subfloor units 5 to accommodate electrical wiring 15 and sewer and water pipe 18 within the perimeter of the structural frame 11. Caster wheels 26 are pivotally bolted to the structural frame 11 in spaced relationship with respect to each other to lend mobility and accommodate added weight to the newly constructed center module 25, as hereinafter described. As illustrated in FIG. 4 the center module 25 is rolled beneath an insulation applicator 22 having downwardly-extending, spaced-apart applicator heads 22*a*, for application of a foamed insulation over the electrical wiring 15, sewer and water pipe 18 and the underlying subfloor units 5. After the foam insulation has solidified, these elements are bonded together structurally and the foamed center module 25 is reversed 180 degrees, while also pivoting the caster wheels 26 180 degrees, to again support the center module 25 in upside-down relationship, as illustrated in FIG. 5. Positioning of the center module 25 in this configuration as illustrated in FIGS. 5–8 facilitates upward-facing of the wall and partition pattern 27 inscribed on the wear sheet 4*b*, as illustrated in FIG. 5 and allows assembly of the partitions 29 on top of base channel runners 15, which are installed on top of the wear sheet 4*b* according to the wall and partition pattern 27. The U-shaped base channel runners 15 are bolted into position on the subfloor units 5 through the overlying flooring, omitting the door opening spaces. Pre-fabricated partitions 29 are then vertically bolted to the underlying base channel runners 15 and the structural frame 11 and full-height, interlocking, prehung doors (not illustrated) are hung on the door frames 23*a*, also positioned on oppositely-disposed spaced base channel runners 14, as further illustrated in FIG. 6. The completed partitions 29, columns 23 and door frames 23*a* are capped and connected by top plate channels (not illustrated) similar in design to the base channel runners 14, in inverted configuration. Appliances, cabinets, electrical fixtures, air conditioning, ductwork and like accessories, as well as other functional components (not illustrated) of the modular structure are then placed, connected and secured in the modular structure 1 in conventional fashion. Abutting edges of the partitions 29 are bonded at the top, bottom and sides to further secure the internal components of the modular structure 1.

Referring now to FIGS. 7 and 8 of the drawings, all three ceiling sections, which include the fixed ceiling section 37 that closes the top of the center module 25, as well as the first hinged ceiling panel 36*a* and second hinged ceiling panel 36*b*, have been pre-fabricated in similar manner to the floor section or foundation of the center module 25 and are hinged using the connecting panel hinge 9 and the extended width hinge 10, as described above. When closed in hinged configuration, the first hinged ceiling panel 36*a* and second hinged ceiling panel 36*b* are folded and stacked on the fixed ceiling section 37, as illustrated. Pre-fabricated exterior end walls 24 are then bolted in place on each end of the center module 25 and the end walls 24 typically include exterior windows 30 and door frames 23*a*, with sliding doors 23*b*, as illustrated in FIGS. 11 and 12. Additional components to be mounted on the modular structure 1 at the job site are collected and stacked on the second hinged ceiling panel 36*b*, as further illustrated in FIG. 7 and as heretofore described. Pre-fabricated exterior hinged floor and wall assemblies 34 are then hingedly connected to each longitudinal bottom edge of the center module 25, as illustrated in FIG. 11, by means of additional connecting panel hinges 9. Each of the hinged floor and wall assemblies 34 include a floor panel 25*a*, which has been previously provided with carpet 51 as heretofore described and an end wall 24 which is bolted to the outside edge of the corresponding floor panel 25*a* and to the fixed ceiling 37. Each of the sidewalls 28 is further fitted with windows 30, as further illustrated in FIG. 11. At this point in the assembly line the caster wheels 26 are unbolted from the center module 25 and are replaced by multiple tandem wheels 40*a*, topped by fender skirts 40, for road travel. Furthermore, a fifth wheel 46 or towing device 47 of selected design is mounted at one of the end walls 24 and onto the structural frame 11 of the center module 25, for towing purposes. Brake lights 45, illustrated in FIG. 11, are added to fit the folded modular structure 1 for road travel and towing by a tractor or truck (not illustrated). When in travel configuration, each hinged floor and wall assembly 34 is folded against the respective side partitions 29 of the center module 25 as illustrated in FIG. 12 and the roof trusses 32 and roofing 39, as well as other accessories (not illustrated) are stacked on top of the second hinged ceiling panel 36*b*, which, along with the first hinged ceiling panel 36*a*, is folded and stacked on top of the fixed ceiling section 37. The modular structure 1 is now in towing configuration and is wrapped with a packaged sheeting (not illustrated) which may be characterized as a heavy sheet vinyl material, for towing to the job site. In a most preferred embodiment of the invention the wheels 40*a* are conventional pneumatic tires and wheels mounted on removable axle units for easy disassembly and removal when the modular structure reaches the jobsite.

Upon reaching the jobsite, the modular structure 1 is prepared for deployment by initially removing the packaged sheeting and is then moved into position over a pre-prepared site or foundation which has been suitably leveled. The axle units mounting the wheels 40*a* are then removed from the center module 25 and the center module 25 is lowered and the pivoting anchor plates 16 are pivoted to extend from the structural frame 11 and are pinned securely to the underlying earth foundation with anchor spikes 42, as illustrated in FIGS. 12 and 13. The anchor spikes 42 are driven through openings in the pivoting anchor plates 16 in the structural frames 11 of all three floor sections, including the center module 25 and the first side module 33 and second side module 33*a*. After securing the entire modular structure 1 to the earth, each abutting floor panel 25*a* of the corresponding hinged floor and wall assembly 34 is hinged downwardly on each side of the center module 25 on the respective connecting panel hinges 9, while the corresponding attached sidewall 28 is hinged upwardly on the corresponding floor panel 25*a* and connecting panel hinge 9, to the vertical configuration, as illustrated in FIG. 13. When these components of each hinged floor and wall assembly 34 are secured, the roof trusses 32 and roofing 39, as well as other accessory components (not illustrated) stacked on the second hinged ceiling panel 36*b*, are unloaded and the second hinged ceiling panel 36*b* is folded outwardly on the extended width hinge 10, to rest against the upward-standing corresponding sidewall 28. The first hinged ceiling panel 36*a* is then folded in the opposite direction on the corresponding connecting panel hinge 9, to rest against the opposite and cooperating upward-standing sidewall 28. These operations complete the first side module 33 and second side module 33*a*, which lie on either side of the center module 25, except for the end walls 24. The outside edges of the first hinged ceiling panel 36*a* and second hinged ceiling panel 36*b* are then bolted to the corresponding upward-standing sidewalls 28, to complete construction of the modular structure 1. End walls 24 are then bolted on each end of the first side module 33 and the second side module 33*a* in the same manner as described above with respect to the end walls 24 mounted on the center module 25. The perimeters of the respective first side module 33 and second side module 33*a* are foam-calked by hand and cosmetically trimmed, as necessary. The optional roof trusses 32 are then installed on the flat, coplanar first hinged ceiling panel 36*a*, second hinged ceiling panel 36*b* and fixed ceiling section 37, along with the gable walls 24*a*, as illustrated in FIG. 14. Roofing 39 is then attached in sheets as heretofore described, to complete the roof of the modular structure 1. It will be appreciated by those skilled in the art that the first hinged ceiling panel 36*a*, second hinged ceiling panel 36*b* and fixed ceiling section 37 may be sealed and capped by any type of desired roof in lieu of the roof illustrated in FIG. 14, according to the knowledge of those skilled in the art. Auxiliary components such as the metal facia/soffitt 48, metal wall louvers 49, porch roof cover 38 and metal rake trim 50 may then be added to trim the modular structure 1 in finished configuration. Continuous sheets of the flexible blanket 44 have been previously applied to the exterior and interior surfaces of the fixed ceiling section 37, first hinged ceiling section 36*a*, second hinged ceiling section 36*b*, end walls 24 and side walls 28, of modular structure 1, as heretofore described. The utilities are then connected as in conventional structures and the respective partitions, doors, shelves and like accessories are added to complete the interior of the modular structure 1, as required. The wear sheet 4*b* is then removed from all floors of the three modules 25 and the modular structure 1 is ready for occupancy.

It will be appreciated by those skilled in the art that the modular structure 1 of this invention can be adapted to substantially any structure, whether residential or commercial, and including mobile homes. For example, mobile homes may be constructed using the floor foundation of the center module 25 which is constructed according to the techniques outlined herein and illustrated in FIGS. 1–5, either by assembly line techniques or otherwise, wherein the floor foundation of the mobile home can be placed directly on a pre-prepared ground site without the necessity of elevating the mobile he on wheels, as is conventionally accomplished. Furthermore, such a structure can be easily transported from the factory to the jobsite using the removable wheel system and towing package outlined herein. Moreover, it will be appreciated by those skilled in the art that multiple units of the center module 25 can be stacked from the ground up to shape multi-level structures according to techniques outlined in this application. Similarly, the hinged floor and wall assemblies 34 can be added to the center module 25 as described herein to complete multi-level permanent structures or single-level permanent or temporary structures, wherein the structures can be easily re-folded and re-located according to the techniques outlined herein.

Additional features which will be important depending upon the area where the modular structure 1 of this invention is to be located are: the radon gas diffusion or exhaust system 55, illustrated in FIGS. 10A and 10B, which facilitates continuous exhausting of air in each habitable room of the modular structure to remove radon gas that may inadvertently be introduced into the building from the underlying soil; and the flexible blanket 44, which is installed on selected exterior and interior surfaces of the modular structure 1 as described above, to facilitate insulation efficiency and pest control due to the interior components of the laminated package sheeting, as heretofore described.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A method of constructing a modular structure comprising the steps of constructing a frame for defining the foundation of a primary module; installing utility components on said frame; mounting fixed side partitions, end walls and a fixed ceiling on said frame to define said primary module, said primary module having a top longitudinal edge and a bottom longitudinal edge; hingedly attaching a pair of floor panels having wall panels hingedly attached thereto, to said bottom longitudinal edge, respectively, of said primary module; hingedly attaching a pair of ceiling/roof panels to said top longitudinal edge of said primary module; and installing an insulating laminated blanket on said fixed ceiling, said end walls, said ceiling/roof panels and said wall panels, whereby said floor panels fold against said fixed partitions of said primary module, said wall panels fold against said floor panels and said ceiling/roof panels fold against said fixed ceiling of said primary module when said modular structure is in shipping configuration, and said floor panels unfold into a substantially horizontal configuration substantially coplanar with said foundation of said primary module, with said wall panels extending vertically upwardly and said ceiling/roof panels unfold to engage said wall panels and define secondary modules adjacent to said primary module, when said modular structure is in functional configuration.

2. The method of claim 1 comprising the step of mounting rollers on said frame for transporting said frame.

3. The method of claim 2 comprising the step of applying insulation to said frame over said utility components.

4. The method of claim 1 comprising the step of providing end walls, interior partitions, windows and doors in said primary module and said secondary modules.

5. The method of claim 1 comprising the step of stacking trusses on said ceiling/roof panels when said modular structure is in said shipping configuration and mounting said trusses on said primary module and said secondary modules and constructing a roof on said trusses when said modular structure is in said functional configuration.

6. The method of claim 1 comprising the steps of:

(a) mounting rollers on said frame for transporting said frame;

(b) applying insulation to said frame over said utility components; and (c) stacking trusses on said ceiling/roof panels when said modular structure is in said shipping configuration and mounting trusses on said primary module and said secondary modules and constructing a roof on said trusses when said modular structure is in said functional configuration.

7. A method of constructing a modular structure comprising the steps of constructing a portable middle section of the modular structure including plumbing, insulation and a floor plan imprint; mounting temporary wheels on the portable middle section; installing end walls and partitions on the portable middle section; installing a pair of hinged ceiling/roof panels on selected ones of said partitions; installing plumbing, cabinets, wiring, light fixtures, air conditioning ducts and appliances in said portable middle section installing a pair of hinged floor panels and hinged wall panels hinged to said hinged floor panels, on each longitudinal edge of said portable middle section; removing the temporary wheels and lowering said portable middle section to a pre-leveled permanent site; securing said hinged floor panels in a horizontal position on each side of the portable middle section at the site, with said hinged wall panels projecting upwardly; folding said hinged ceiling/roof panels into engagement with said hinged wall panels and securing said hinged ceiling/roof panels in place; installing trusses on said hinged ceiling/roof panels; and installing metal roofing on said trusses to complete said modular structure.

* * * * *